US007448606B1

(12) United States Patent
Johnson

(10) Patent No.: US 7,448,606 B1
(45) Date of Patent: Nov. 11, 2008

(54) LARGE AUTOMOTIVE PANEL PAINT RACK

(75) Inventor: Bryan Thomas Johnson, Vadnais Heights, MN (US)

(73) Assignee: Innovative Tools & Technologies, Inc., St. Paul, MN (US)

( * ) Notice: Subject to any disclaimer, the term of this patent is extended or adjusted under 35 U.S.C. 154(b) by 158 days.

(21) Appl. No.: 10/982,007

(22) Filed: Nov. 4, 2004

Related U.S. Application Data

(60) Provisional application No. 60/526,771, filed on Dec. 4, 2003.

(51) Int. Cl.
*B23Q 3/00* (2006.01)

(52) U.S. Cl. .......... 269/17; 269/16

(58) Field of Classification Search .......... 269/16, 269/17, 71, 104; 248/127
See application file for complete search history.

(56) References Cited

U.S. PATENT DOCUMENTS

| | | | | |
|---|---|---|---|---|
| 569,289 A | | 10/1896 | Lynch | |
| 653,519 A | | 7/1900 | Masters | |
| 2,803,872 A | | 8/1957 | Massa | |
| 2,827,690 A | | 3/1958 | Brown | |
| 3,643,935 A | * | 2/1972 | Bell | 269/16 |
| 3,858,864 A | | 1/1975 | Waldow | |
| 4,245,786 A | | 1/1981 | Abrahamsen et al. | |
| D303,031 S | | 8/1989 | Ellis | |
| 4,880,194 A | | 11/1989 | Geise | |
| 5,141,211 A | * | 8/1992 | Adams, Jr. | 269/16 |
| 5,675,417 A | | 10/1997 | Ventura | |
| 5,707,450 A | * | 1/1998 | Thompson | 118/500 |
| 5,709,373 A | | 1/1998 | Wasylynko | |
| 6,003,830 A | * | 12/1999 | Egan | 248/676 |
| 6,024,348 A | * | 2/2000 | Ventura et al. | 269/17 |
| 6,173,947 B1 | | 1/2001 | Johnson | |
| 6,409,128 B1 | * | 6/2002 | Deshler | 248/127 |

OTHER PUBLICATIONS

Collison Services, Makes Handling Parts a Breeze the Roto Maxx Aug. 20, 2001.
The Ultimate Auto Body Parts Stand, Kno: Greef MFG. Feb. 2002, Canada.
Tools & Equipment Flex Bench, undated, p. 45 Catalog. Collision Services Nov. 4, 2004.

* cited by examiner

*Primary Examiner*—Lee D. Wilson
(74) *Attorney, Agent, or Firm*—Mueting, Raasch & Gebhardt, P.A.

(57) ABSTRACT

A large automotive panel paint rack has a wheel-mounted base with an adjustable upright post and at least one platform having adjustable support members and hook members. It also has heat and paint-resistant protective rubber sleeves to keep critical adjustment threads free from over-spray. The large panel paint rack permits stationary support of a large part, especially a large automotive panel part for preparation work, repair and painting.

19 Claims, 21 Drawing Sheets

LARGE AUTOMOTIVE PANEL PAINT RACK

This application is a non-provisional application filed under 35 U.S.C. §111(a), claiming priority of the provisional application Ser. No. 60/526,771 filed Dec. 4, 2003.

BACKGROUND

Numerous paint racks have been provided in prior art that are adapted to include conveyor belts and large racks for holding automotive parts for painting. A problem has been holding the automotive part to be painted in a position for even distribution of paint thereon. An additional problem is the amount of floor space needed to house these racks while the paint thoroughly dries.

While these units may be suitable for the particular purpose to which they address, they would not be as suitable for the purposes of the present invention as hereinafter described. In the automotive repair painting industry, the ability to hold automotive parts at an angle both convenient to the painter and in a position similar to the part's position in use is important to achieve an aesthetically pleasing painted surface. Additionally, being able to move a part after it has been painted and storing the painted part during drying allows the painter to prepare, repair and paint additional automotive parts in a more efficient manner than past practice of leaving the part to dry in the painting booth. Also, the device of this invention enables the user to consolidate limited floor space during the drying and storing of the part. The device of this invention adjustably positions and securely holds the part for repair, preparation, painting and storage. Once the part has been fixed in position on the device, one-handed positioning of the part is provided by this invention. Use of the device of this invention provides access to spray from all angles an automotive panel such that there is no need to mask the adjacent parts, no unwanted lines occur in the paint and more efficient use

SUMMARY

The present invention is directed to a large automotive panel paint rack that satisfies these needs to provide an economic, space saving, efficient paint rack for use with large automotive panels. A large panel automotive paint rack having features of the present invention comprises a wheel mounted base with an adjustable upright post and at least one tee frame the provides a platform, the platform having adjustable support members and hook members for attachment of various sized panels thereto. Where more than tee frame is provided, each tee frame adjusts along an X axis and the two tee frames adjust along a Y axis relative to each other. A hand-release lock adjusts the platform relative to the upright post mounted base. The adjustable upright post and at least one platform may be positioned using one had allowing the user to remain holding the paint sprayer. The device of this invention also has a plurality of heat and paint-resistant protective rubber sleeves to keep critical adjustment threads free from over-spray. The large automotive panel paint rack permits stationary support of a large part, especially a large automotive panel part for preparation work, repair and painting.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

Understanding of the invention will be enhanced by referring to the accompanying drawings, in which like numbers refer to like parts in the several views and in which.

DETAILED DESCRIPTION OF THE CURRENTLY PREFERRED EMBODIMENTS

Understanding of the invention will be further enhanced by referring to the following illustrative but non-limiting example. Over-spray refers to spray painting where paint is sprayed beyond the target.

The device of this invention securely holds the part during repair, preparation, painting and storage. The rod positioning lock and the stationary latch handle provide one-handed operation of this invention.

In the automotive repair painting industry, the ability to hold automotive parts at an angle both convenient to the painter and in a position similar to the part's position in use is important to achieve an aesthetically pleasing painted surface. Additionally, being able to move a part after it has been painted and storing the painted part during drying allows the painter to prepare, repair and paint additional automotive parts in a more efficient manner than leaving the part to dry in the painting booth. Also, the device of this invention enables the user to consolidate limited floor space during the drying and storing of the part.

Figure 1:
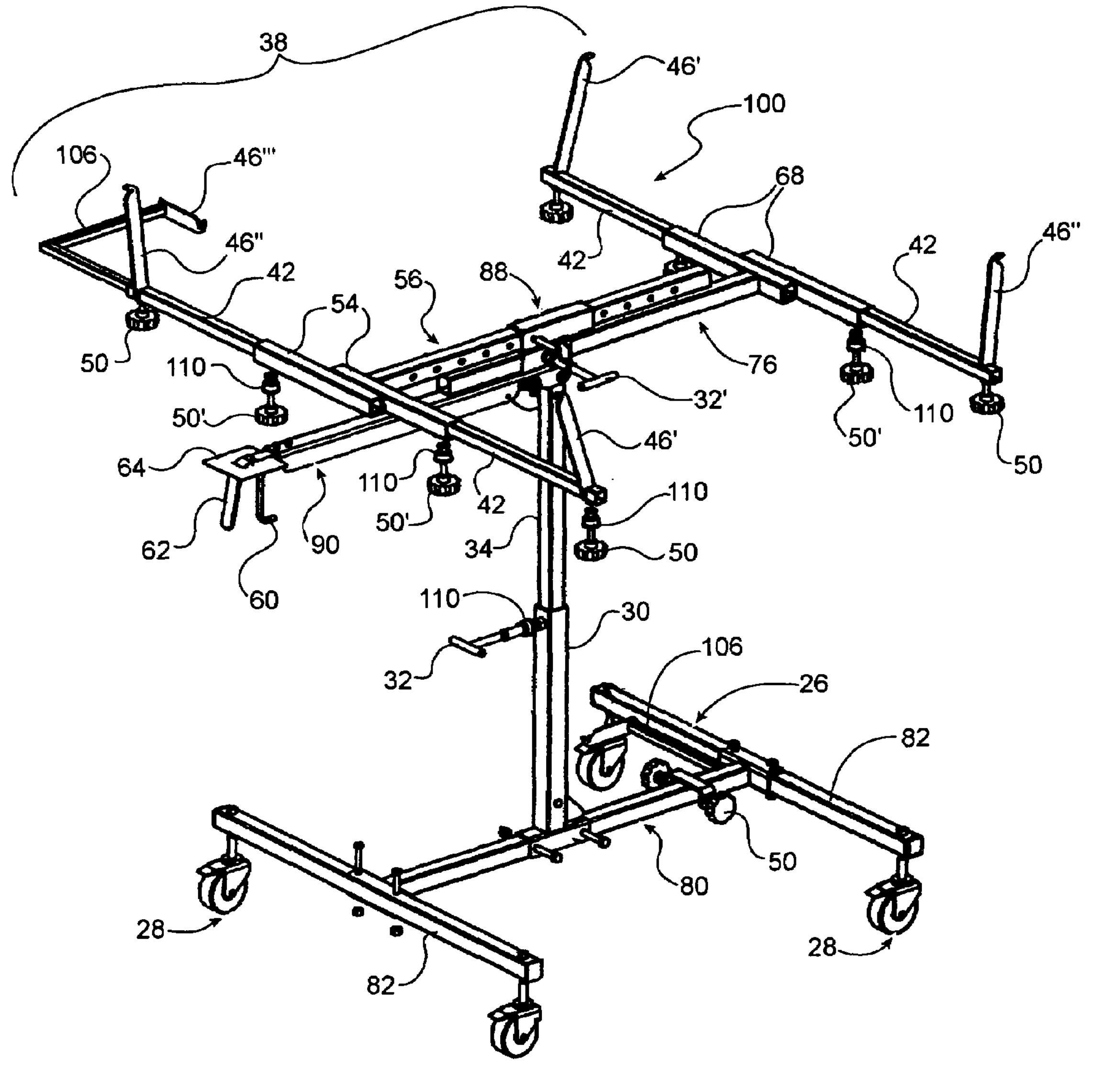
FIG. 1 is a side perspective view of the device of this invention.
Figure 3A:
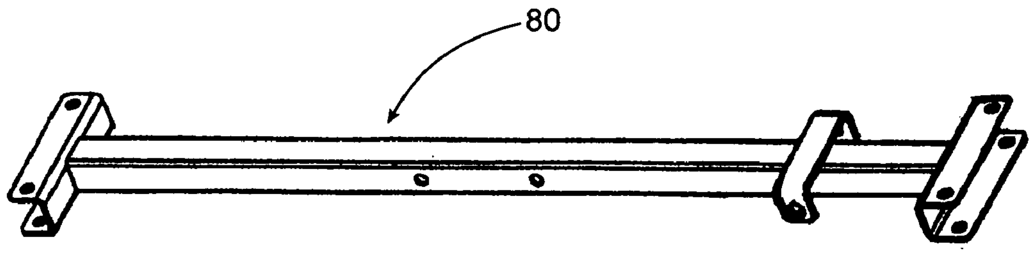
FIG. 3A is a side perspective view of base frame with side base arms and wheels and casters removed.
Figure 3B:
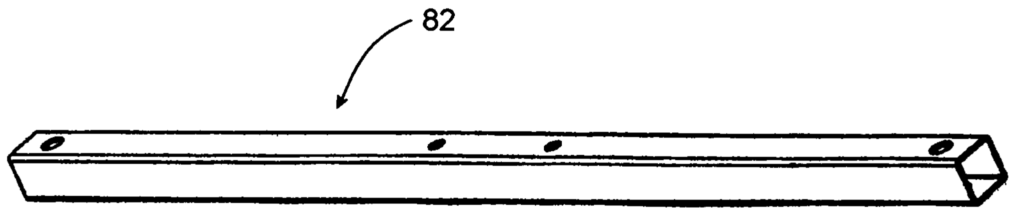
FIG. 3B is a side perspective view of the side base arm.
Figure 4:
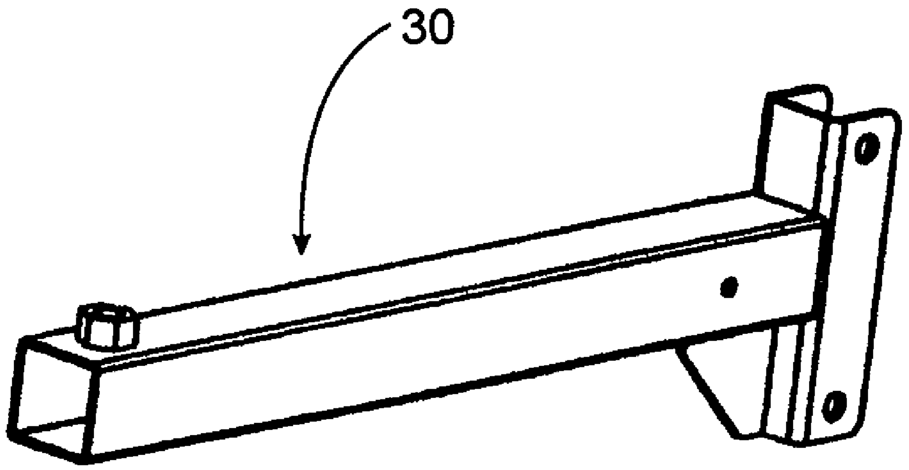
FIG. 4 is a side perspective view of central post prior to being mounted to base frame.
Figure 18:
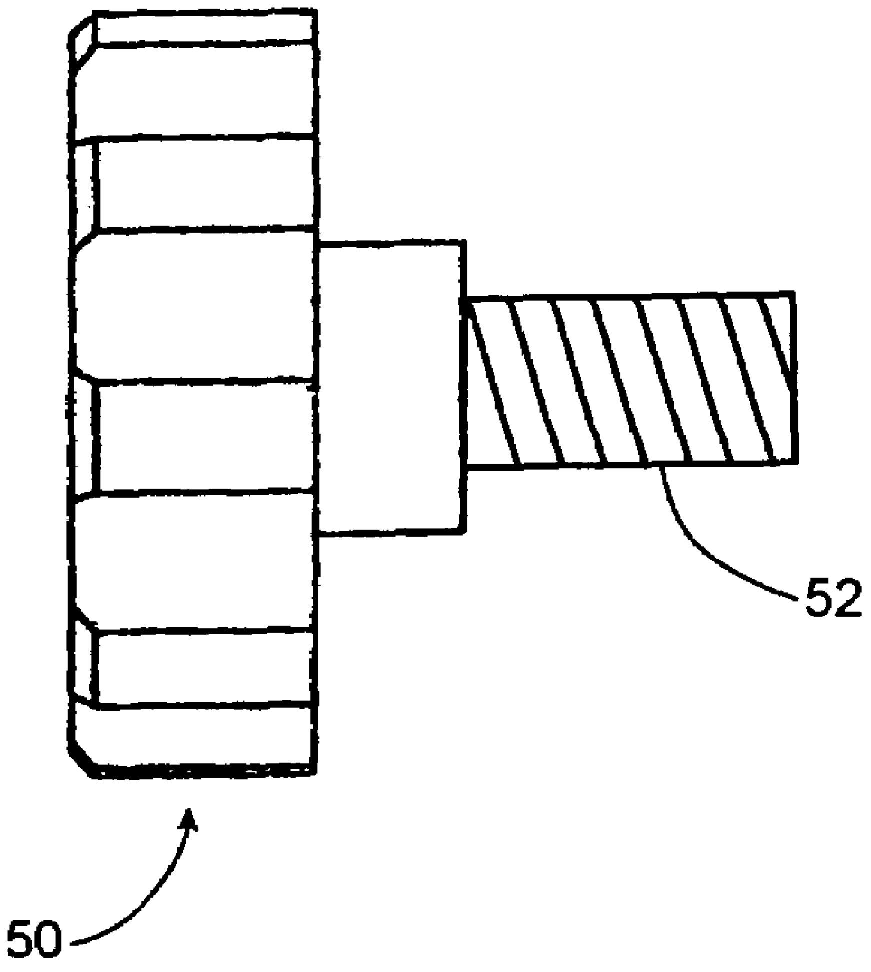
FIG. 18 is a side view of screw knob with threads indicated on stem.

Turning now to the drawings, in which like reference characters refer to corresponding elements throughout the several views, FIG. 1 illustrates a large automotive panel paint rack 100 of heavy gauge steel construction with a durable powder coat finish. In actual use conditions, generally square-shaped steel tubing has been used, shown in detail in FIGS. 2-12, although other shapes of other rigid materials could also be used. Large panel paint rack 100 has a wheel 28 mounted base, indicated generally at 26, the wheels, 28 in actual use conditions Total Lock® wheels, although other wheels that can be locked could be used, the wheels mounted on a pair of base arms 82 in turn mounted to base frame 80, FIGS. 3A & 3B. An upright post 30 is centered over the base frame 80 mounted by fastening means such as nuts, bolts and welds. The upright post 30 has adjustment means in the form of an adjustment knob 32 that permits the upright post 30, shown in detail in FIG. 4, to adjustably receive inside post 34 and fix inside post 34 in the desired position by adjustment knob 32. Adjustment knob 32 is mounted on a screw that protrudes from an aperture in upright post 30 and by friction means holds the inside post 34 in a desired position. A platform 38 is indicated at FIG. 1 composed of multiple parts. A pair of tee frames, apertured tee frame 56 and tee frame 76, combine to form the platform 38 although a single tee frame could be used. The tee frames 56, 76 are mounted together such that they may be adjusted longitudinally relative to each other. Tee frames 56, 57 are slidably mounted to rack 100 by being received into trunnion 88 which has sleeves 84,86 mounted to inside post 34. A second adjustment knob 32' frictionally fixes tee frame 76 in place within trunnion sleeve 84 shown in detail in FIG. 6. Apertured tee frame 56 is held in the desired position by means of pin 66 received by apertured tee frame 56, in turn held in position in sleeve 86. Each tee frame 56, 76 has a pair of adjustable arm support members 42 of square tubular steel each having an adjustment hook 46 fixedly mounted thereto. Each arm support member 42 is received into a tubular member 54, 68 of their respective tee frame 56, 76. Arm support members 42 are fixed in position by use screw threads 52 of screw knobs 50', shown in detail at FIG. 18. In use, arm support members 42 are symmetrically placed such that the panel to be painted is balanced there between. Hook members 46' and 46" are fixedly positioned on the outer end of each arm support member 42 such that the hooks are positioned at differing angles to compensate for the difference of tubular member 54 and 68. In actual use conditions, hook member 46' is positioned 20 degrees from vertical and hook member 46" is positioned 6 degrees from vertical although other angles could be utilized. Hook members 46 are adjusted laterally by screw knobs 50'. Optional arm extension 106, shown in detail at FIG. 12, is received by the outside end of arm support 42 and fixed there by means of screw knob 50. Arm extension 106 has an extra segment, again with hook members 46'", such that a more difficult to position panel, such as a tail gate, may be grasped and hung between the extension arm supports 106. When extension arm 106 are used, support arm 42 may be repositioned such that the hook member 46 attached thereto hangs in an out of the way position. These elements together form the platform 38 for positioning a panel on for repair, preparation and painting. Since it is important in automotive painting to put the panel in the position of use while being painted, the platform 38 may be pivoted to any of several positions for work.

Figure 2:
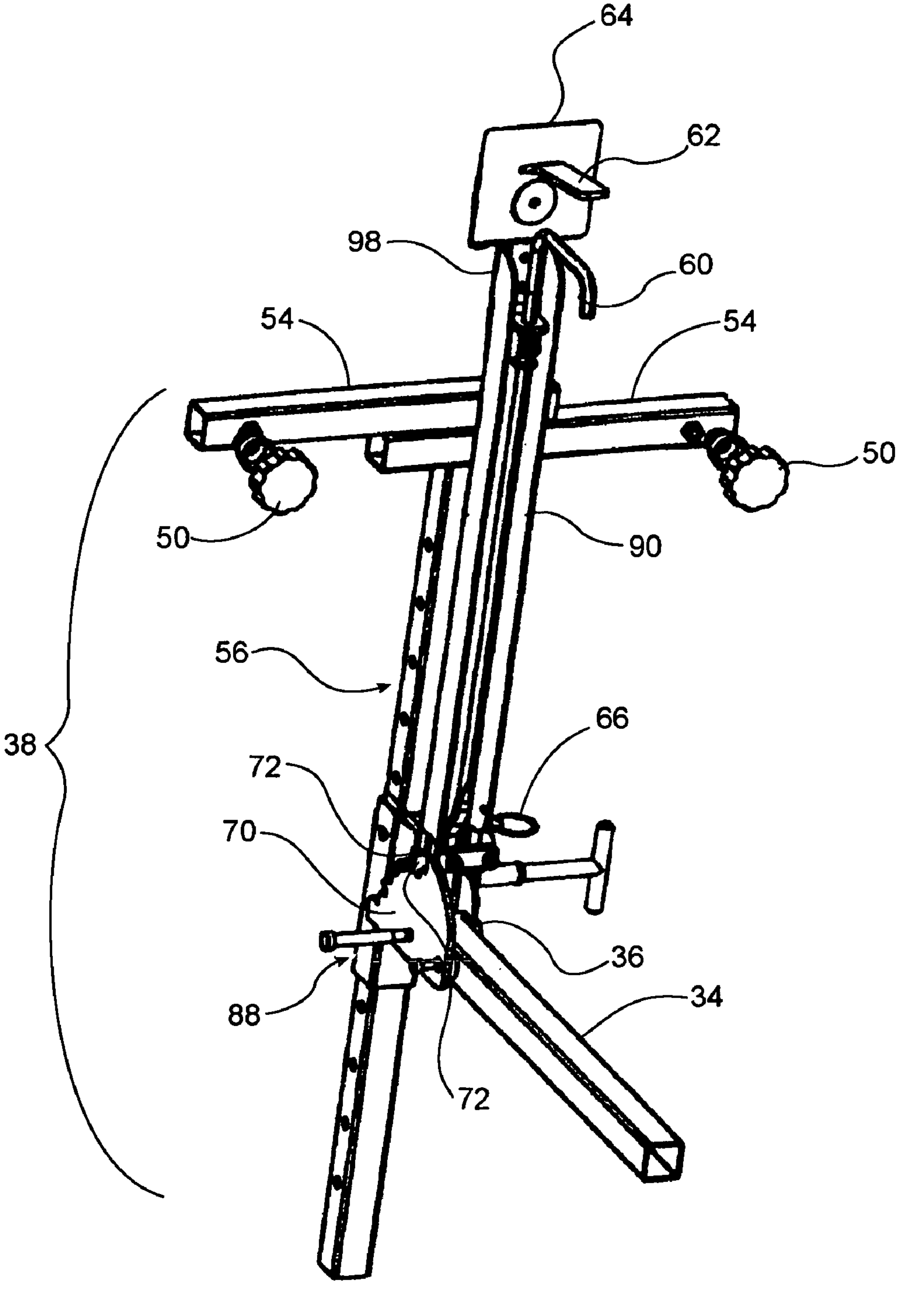
FIG. 2 is a side perspective view of the device of FIG. 1 with the base removed.
Figure 5:
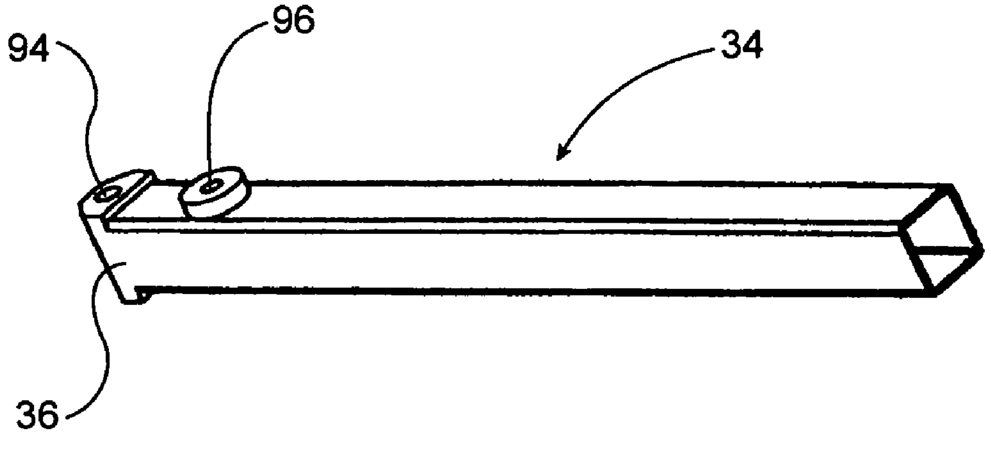
FIG. 5 is a side perspective view of inside central post prior to being pivotally mounted to bracket of FIG. 6.
Figure 6:
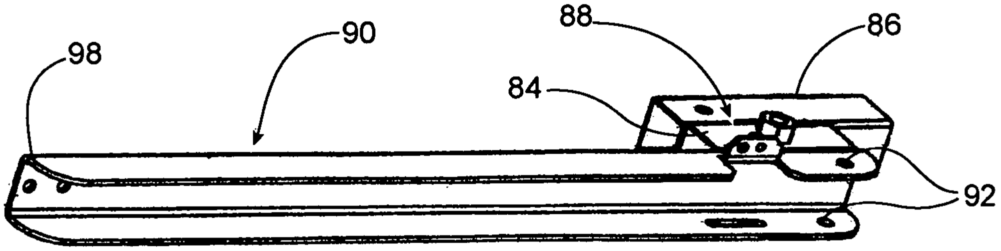
FIG. 6 is a side perspective view of bracket for receiving rod positioning lock and aperture for pivotally receiving inside central post from base frame, the bracket with a dual trunnion sleeve support mounted thereon, a sleeve for receiving a Tee frame and a sleeve for receiving an apertured Tee frame.

Bracket 90, shown in detail in FIGS. 2 and 6, is pivotably mounted to proximal end 36 of inside post 34, FIG. 5, by fastening means, such as bolt and nut, received by orifice 94 of central post 34 and aperture 92 of bracket 90.

Figure 13:
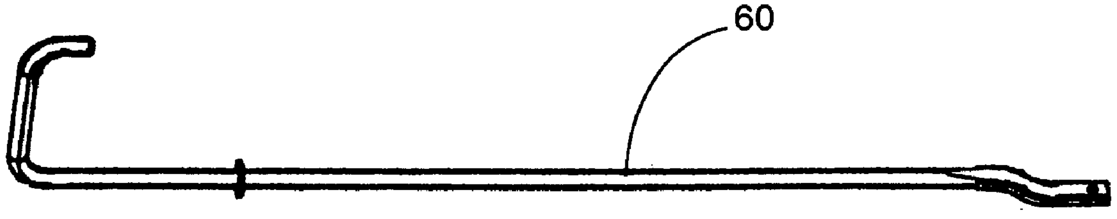
FIG. 13 is a perspective view of the rod handle received by the bracket of FIG. 6.
Figure 14:
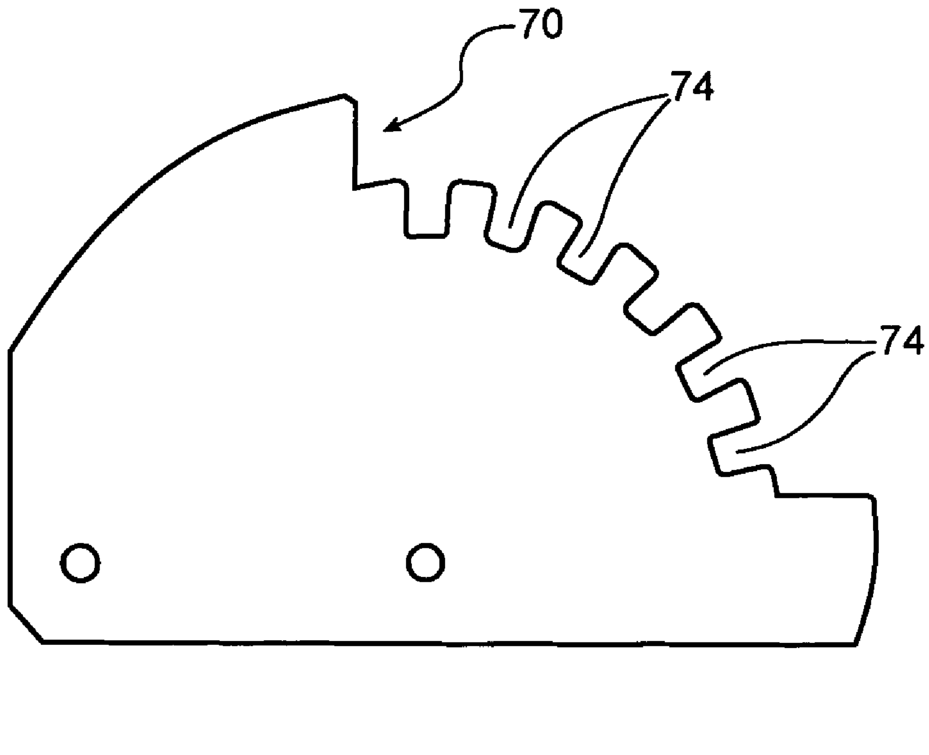
FIG. 14 is a side view of the index plate for bolting to bracket of FIG. 6.
Figure 19:
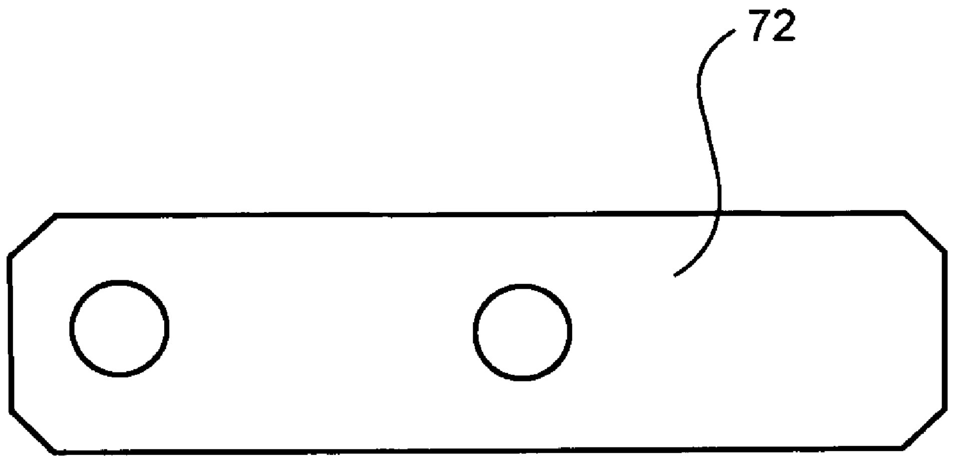
FIG. 19 is a detailed view of latch bar.
Figure 20:
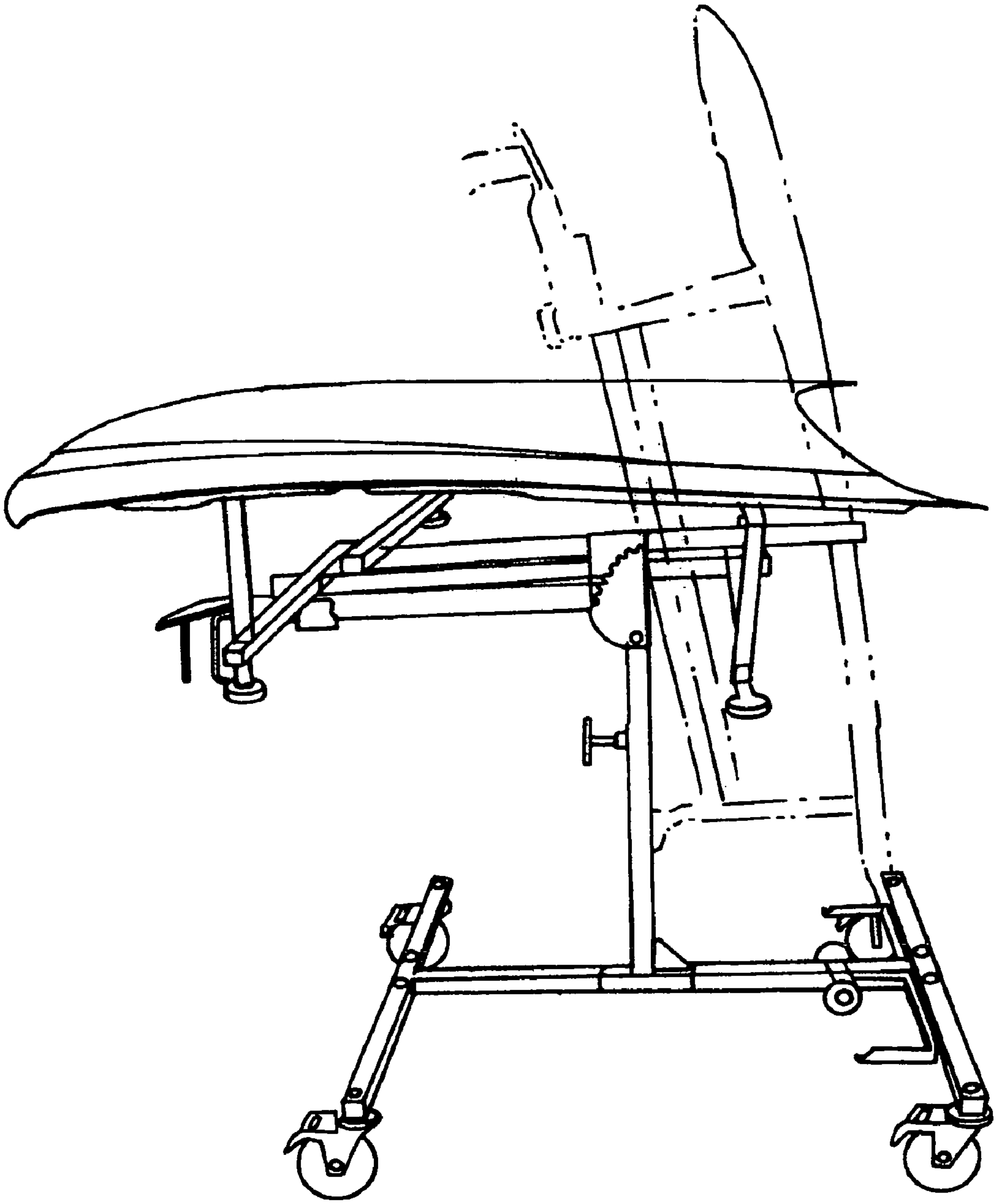
FIG. 20 is a side perspective view of the device of FIG. 1 with the range of adjustment indicated in phantom.

Bracket 90 has a dual trunnion sleeve 88 support mounted thereon, FIG. 6, a sleeve 84 for receiving a Tee frame 76 and a sleeve 86 for receiving an apertured Tee frame 56. Bracket 90 is of U-shaped metal and receives rod positioning lock 60, shown in detail at FIG. 13, which fastens and releases bracket about index plate 70, shown in detail at FIG. 14, which is in turn pivotably mounted to inside post 34. User can position the rack 100 in a table-like position, as shown in FIG. 1, by manually releasing rod positioning lock 60 by pulling outwardly on rod 60 releasing a latch bar 72, shown in detail in FIG. 19 and generally at FIG. 2, from index plate 70. When the rack 100 is in the desired position, the rod 60 is manually released allowing latch bar 72 to be received by a slot 74 formed in index plate 70, shown in detail in FIG. 14. Index plate 70 has multiple slots 74 formed therein permitting the rack 100 to be positioned in a table-like position, with tee frame 76 and apertured tee frame 56 generally horizontal, as shown in FIG. 1 and rack 100 may be positioned in a generally upright position as shown in FIG. 20. In actual use conditions, seven positions are accommodated by the index plate 70 provided although it is understood that more positions could be accommodated by forming more slots in index plate 70.

Figure 7:
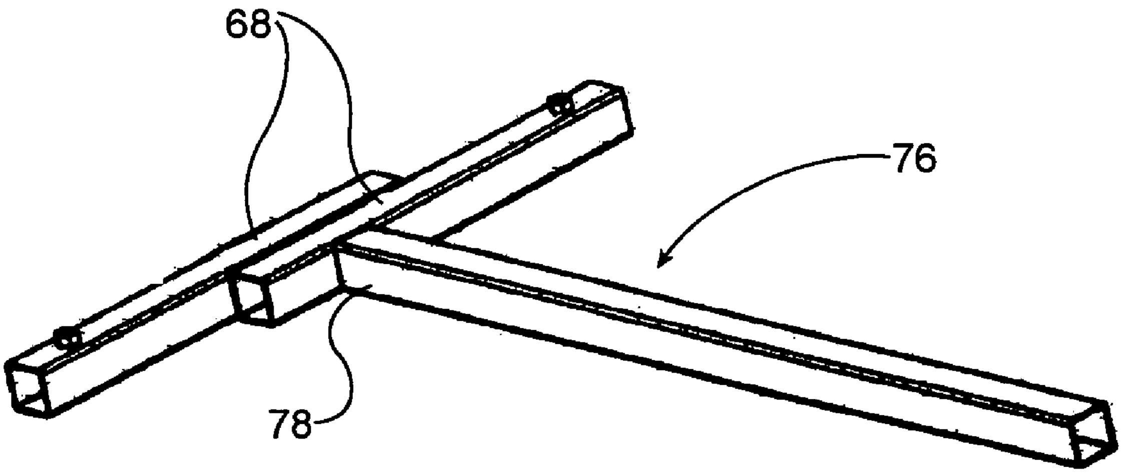
FIG. 7 is a side perspective view of the Tee frame.
Figure 8:
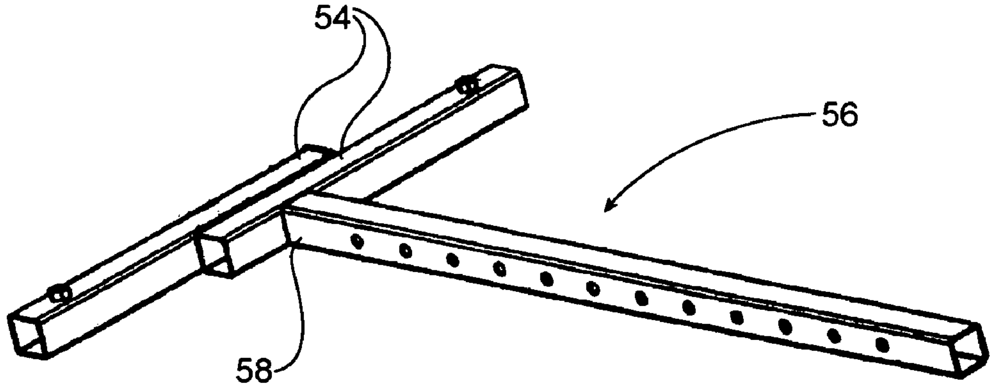
FIG. 8 is a side perspective view of the apertured Tee frame.
Figure 9:
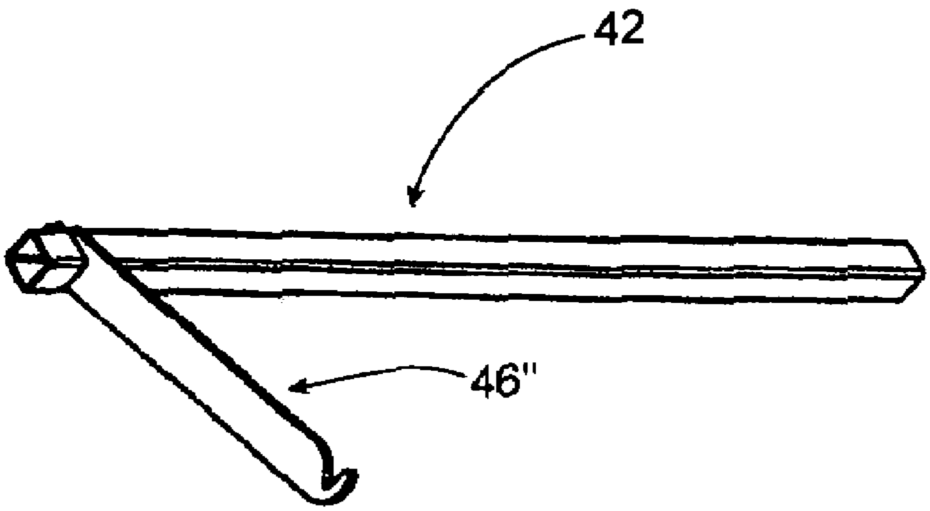
FIG. 9 is a side perspective view of a right arm support with hook mounted thereon.
Figure 10:
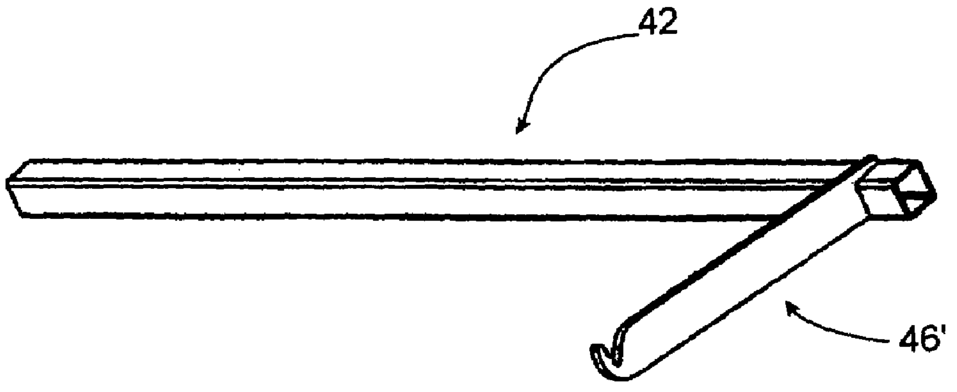
FIG. 10 is a side perspective view of a left arm support with hook mounted thereon.

Both tee frame 76, shown in detail in FIG. 7, and apertured tee frame 56, FIG. 8, have fixedly mounted perpendicularly at the distal end 78 of tee frame 76 and distal end 58 of apertured tee frame 56 a pair of tubular members 68 and 54, fixedly mounted to each other by welds or other fastening means, each to receive an arm support member 42. Each arm support member 42 has fixedly mounted thereon a hook member 46 for attaching a part to be repaired, prepared or painted. Because it is advantageous to hold a part generally level, especially for painting, and because the arm support members 42 are mounted one on top of the other, the hook members 46 are mounted such that they compensate for this difference in mounting position of the arm support members 42, namely the upper support member 42 has a hook member 46" FIG. 9, mounted at a smaller angle than the hook member 46' mounted on the lower support member 42 FIG. 10, for the support arms 42 mounted on the apertured tee frame 56. The support arms 42 mounted on the tee frame 76 have hooks 46 that point in an opposite direction from those hooks mounted on apertured tee frame 56. This opposite tensioned positioning permits a secure temporary positioning of an automotive part on this rack 100. In use, the upper hook members 46 are attached to orifices provided in the inside portions of the automotive panels, the second, lower set of hook members 46 are then positioned and fixed by screw knobs 50'.

Figure 11:
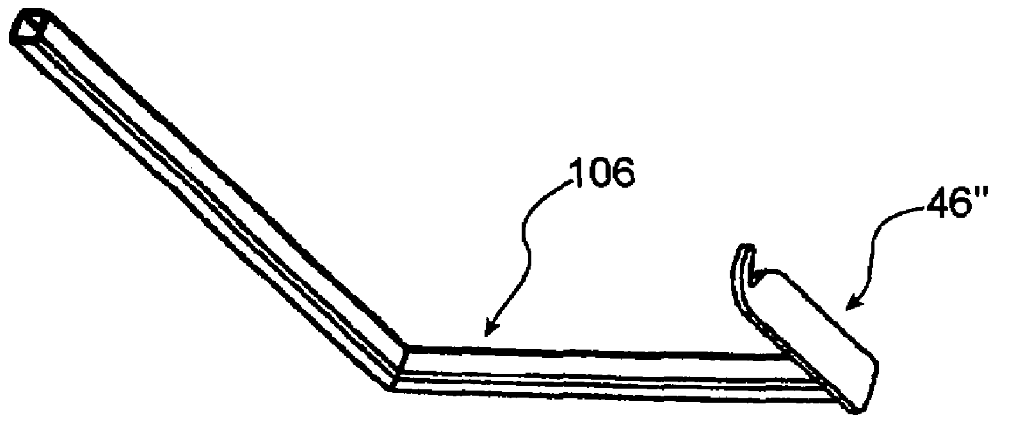
FIG. 11 is a side perspective view of a left extension arm.
Figure 12:
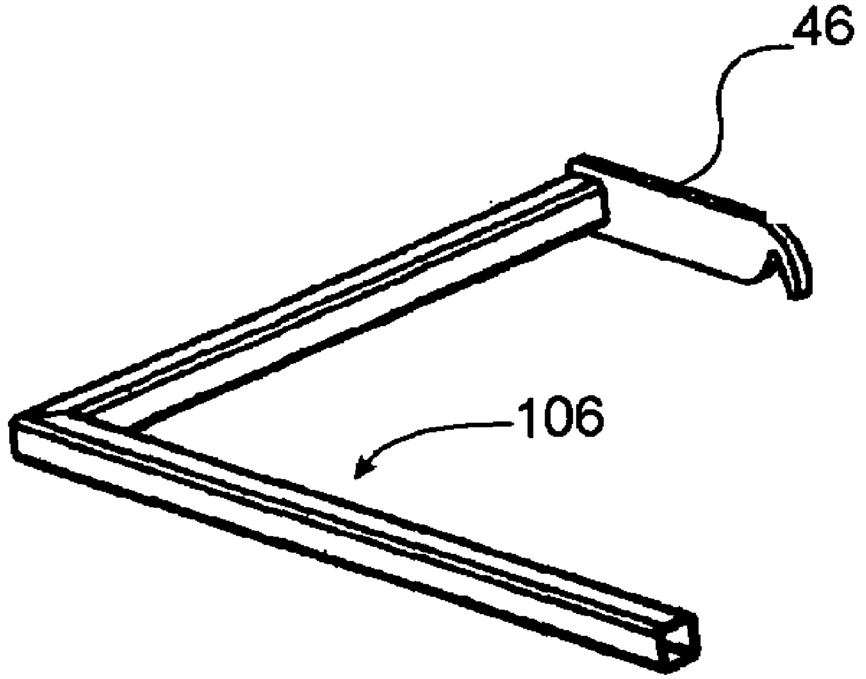
FIG. 12 is a side perspective view of a right extension arm.

Arm extensions 106, shown in FIG. 1 and in detail in FIG. 11, are optionally used when needed, e.g. when painting a tail gate, the are extensions 106 stored on the base 26 and held in both the place of storage and the place of use by screw knobs 50.

Figure 15:
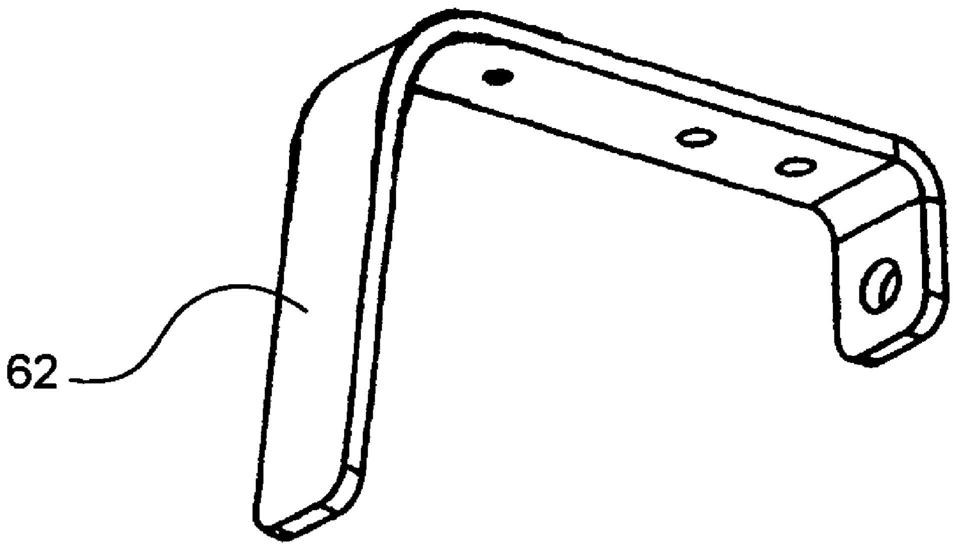
FIG. 15 is a side perspective view of latch handle which is mounted to a proximal end of bracket of FIG. 6.
Figure 16:
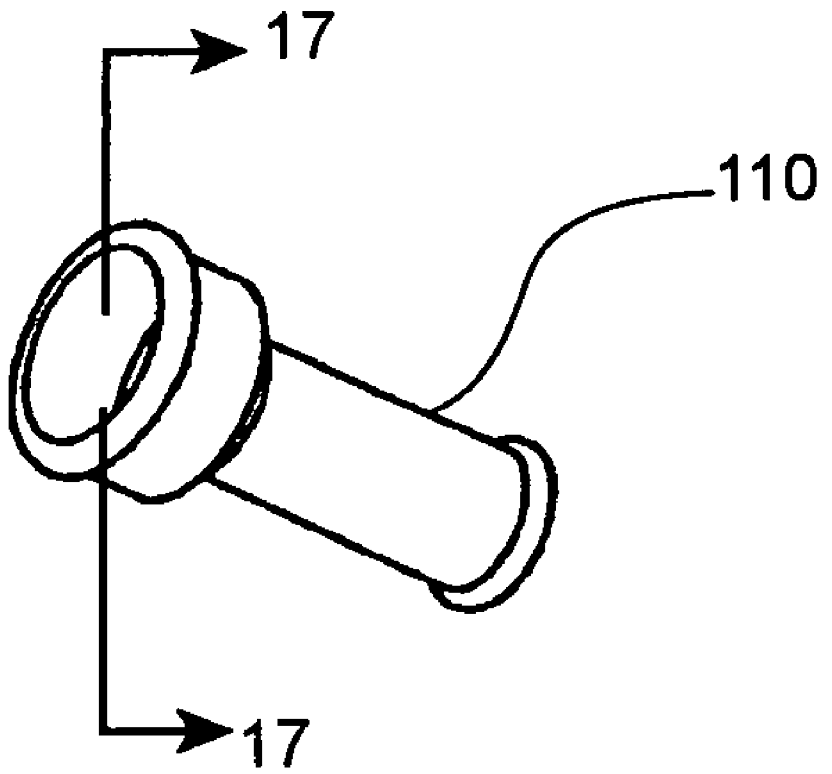
FIG. 16 is a side perspective view of rubber sleeve.
Figure 17:
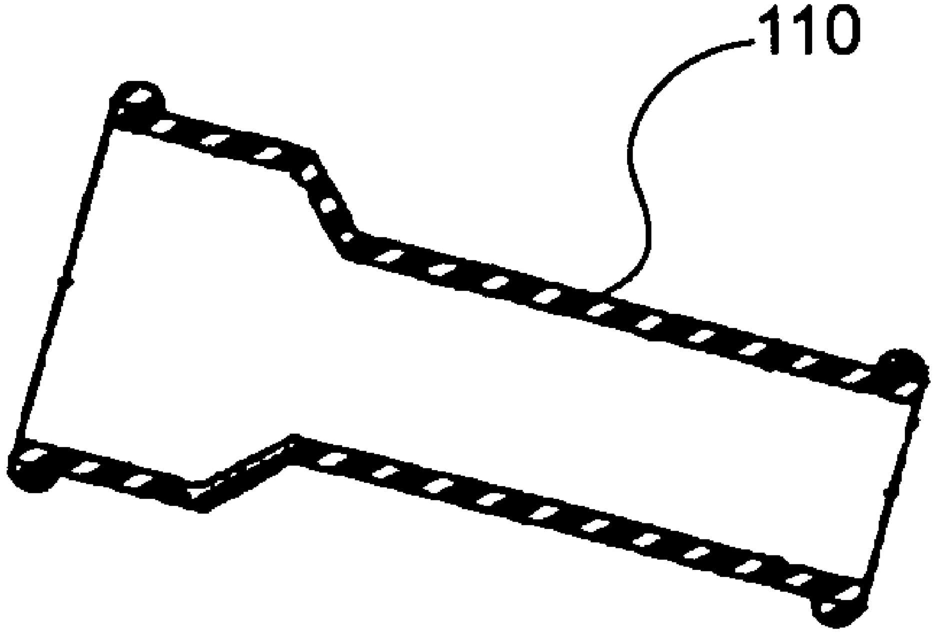
FIG. 17 is a cross-sectional view of rubber sleeve indicated by arrows in FIG. 16.

Latch handle 62, shown in detail at FIG. 15, with spray shield 64 mounted by fastening means, such as screw, nuts and bolts or other fastening means, to a proximal end 98 of bracket, FIG. 1 & 2. Rubber sleeves 110, shown in detail in FIGS. 16 & 17, and indicated at FIG. 1, are provided to shield the screw thread 52 formed on each screw knob 50 from paint over spray.

Rack 100 may be adjusted laterally by releasing screw knobs 50' mounted to arm supports 42 to allow arm supports to be spread apart while still received by tubular members 68. Tubular members 68 receive the non-hook end of arm supports 42 and may be adjusted longitudinally to expand and retracted to a storage size, which illustrates platform tee frame 40 in a retracted position on upright post 30, also in a retracted position.

Because of the square-shape of the materials used, neither the tee frame 40 nor the upright post 30 swivel or shift once in position. Additionally, all four wheels 28 may be locked. In actual use conditions, a five inch Total Lock Wheel System® which utilizes a heavy-duty wheel 28 with a weight rating of 200 pounds per wheel although other wheels could be used. This wheel 28 provides a means for locking the base 26 once the rack 100 is positioned in the desired location. All four wheels 28 may be locked in place by manually engaging the lock, usually by the user's foot.

Tee frame 40 support members 42 received at a first end by sleeve 44 which also may be adjusted in length by adjustment screw 50. A hook member 46 is positioned at a second end of support member 42 which also may have it's position adjusted by an adjustment screw 50.

FIG. 20 indicates the full range of motion available to a user to position the large panel paint rack 100. Shown in phantom is an automobile hood in an upright position at FIG. 20. This indicates the flexibility of the large panel paint rack 100. FIG. 20 illustrates the large panel paint rack 100 in a variety of positions with a variety of automotive panels positioned for painting. To avoid having to mask parts not needing painting, rather than mask the part in place on the automobile, panels needing painting are removed from the automobile and painted. Because automotive panels have internal holes formed during manufacture, the large panel paint rack 100 uses these holes to attach to the automotive panels to the hook members 46 of the device of this invention. Large panel paint rack 100 can hold large automotive panels exactly where they are wanted with a quick adjustment. That means during painting they can be positioned exactly as they would be found on the vehicle, with no missed edges and with better color and surface texture matches. After painting, the parts can be moved easily out of the way no matter how wet the paint is, freeing up the spray booth and making the spray booth and the worker more efficient.

The automotive parts are fixedly positioned on the large panel paint rack 100 so no inadvertent touching of the freshly painted part occurs. The large automotive panel parts may be easily centered on the large panel paint rack 100 which also increases their stability when mounted on such a rack 100.

In use, the user manually positions the rack 100 by locking at least one wheel 28. The user then depresses rod positioning lock 60 by squeezing rod 60 like a pistol grip and bring rack 100 to an upright position. Then in anticipation of the size and shape of the panel to be repaired, prepared or painted, the support arms 42 of apertured tee frame 56, the upper tee frame, are loosened by screw knobs 50' and spread apart laterally with one side being locked by use of screw knob 50'. The panel is the attached by fitting hook 46 into an orifice on the inside surface of the panel and the second hook member 46 is positioned and screw knob 50 tightened. Because the arm support members 42 are mounted one on top of the other, the hook members 46 are mounted such that they compensate for this difference in mounting position of the arm support members 42, namely the upper support member 42 has a hook member 46" FIG. 9, mounted at a smaller angle than the hook member 46' mounted on the lower support member 42 FIG. 10, for the support arms 42 mounted on the apertured tee frame 56. The support arms 42 mounted on the tee frame 76 have hooks 46 that point in an opposite direction from those hooks mounted on apertured tee frame 56. The lower hooks 46 mounted on tee frame 76 are now positioned apart laterally attaching the hook members 46 mounted thereon to orifices on the inner surface of panel and tensioned positioning permitting a secure temporary positioning of an automotive part on this rack 100. Tee frame 56 is adjusted longitudinally relative to apertured tee frame 76 Adjustment knob 32' is tightened and pin 66 is placed into an aperture of apertured tee frame 56. Now that the panel to be repaired, prepared or painted is firmly mounted on the rack 100 user may, using one hand, re-position the rack 100 by depressing rod position lock 60 to release the latch bar 72 from the index plate 70, manually re-positioned and latched into place by releasing the rod positioning lock 60 such that the latch bar 72 is received by a slot 74 and holding rack 100 in the desired position. Large panel paint rack 100 can hold large automotive panels exactly where they are wanted with a quick adjustment. During painting the panel parts can be positioned exactly as they would be found on the vehicle, with no masking required, with no missed edges and with better color and surface texture matches. After painting, the parts can be moved easily out of the way no matter how wet the paint is, freeing up the spray booth and making the spray booth and the worker more efficient.

Although the present invention has been described in considerable detail with reference to certain preferred versions thereof, other versions are possible. For example while inventor believes it is an improvement to provide a wheeled base, a base without wheels and casters could be used. Additionally, a single tee frame could be used to position automotive panel parts. Therefore, the spirit and scope of the appended claims should not be limited to the description of the preferred versions contained herein.

Changes and modifications in the specifically described embodiments can be carried out without departing from the scope of the invention which is intended to be limited only by the scope of the appended claims.

I claim:

1. A stand for holding automotive panels comprising:

a base;

an upright member extending from the base;

a frame member pivotally coupled to the upright member about a pivot axis;

a pivot locking structure coupled to the upright member defining a plurality of locking positions at which the frame member may be locked;

at least one or more arm members associated with the frame member for securely holding an automotive panel; and an adjustment arm associated with the frame member such that a user can grasp a portion of the adjustment arm to unlock the frame member from one of the plurality of locking positions and while continuing to grasp the portion of the adjustment arm pivot the frame member about the pivot axis, wherein releasing the grasp of the portion of the adjustment arm locks the frame member into one of the plurality of locking positions, wherein the adjustment arm comprises a proximal end for engagement with the pivot locking structure and a distal end, wherein the distal end comprises a pistol grip mechanism, wherein the pistol grip mechanism comprises a rigid handle and a trigger, wherein the trigger is movable relative to the rigid handle, and further wherein the pistol grip mechanism is the portion of the adjustment arm that the user grasps to unlock the frame member.

2. The stand according to claim 1, wherein the user disengages a portion of the proximal end of the adjustment arm from the locking structure by grasping the distal end of the adjustment arm.

3. The stand according to claim 1, wherein the adjustment arm further comprises a rigid member fixedly coupled to the frame member and a movable locking member movably coupled to the rigid member for engaging the pivot locking structure so as to lock the frame member in one of the plurality of locking positions.

4. The stand according to claim 3, wherein the movable locking member comprises a proximal end and a distal end, wherein the user disengages the proximal end of the movable locking member from the pivot locking structure by grasping the distal end of the movable locking member, and further wherein the distal end of the movable locking member comprises the trigger of the pistol grip mechanism.

5. The stand according to claim 1, wherein the pivot locking structure defines a plurality of discrete locking positions.

6. The stand according to claim 1, wherein the stand further comprises a plurality of rubber sleeves for protecting portions of the stand from over-spray.

7. A stand for holding automotive panels comprising:
- a base;
- an upright member extending from the base;
- a platform pivotally coupled to the upright member about a pivot axis;
- a pivot locking structure coupled to the upright member defining a plurality of discrete locking positions at which the platform may be locked; and
- an adjustment arm associated with the platform comprising:
  - a rigid member fixedly coupled to the platform, wherein the rigid member comprises a proximal end proximate the upright member and a distal end, wherein a portion of the distal end of the rigid member forms a portion of a pistol grip mechanism; and
  - a movable locking portion movably coupled to the rigid member, wherein the movable locking portion comprises a proximal end proximate the pivot locking structure and a distal end, wherein a portion of the proximal end of the movable locking portion is configured to engage the plurality of discrete locking positions of the pivot locking structure and a portion of the distal end of the movable locking portion forms a trigger of the pistol grip mechanism.

8. The stand according to claim 7, wherein a length of the platform is adjustable along a first axis that is orthogonal to the pivot axis, and further wherein a width orthogonal to the length of the platform is adjustable along a second axis that is parallel to the pivot axis.

9. The stand according to claim 7, wherein the platform comprises a plurality of adjustment hook members positioned to apply outwardly-facing opposing forces to an automotive panel, wherein each adjustment hook member comprises a proximal end coupled to the platform and a distal end terminating in a hook structure for engaging the automotive panel.

10. A stand for holding automotive panels comprising:
- a base;
- an upright member extending from the base;
- a platform pivotally coupled to the upright member about a pivot axis for receiving an automotive panel, wherein a length of the platform is adjustable along a first axis that is orthogonal to the pivot axis, and further wherein a width orthogonal to the length of the platform is adjustable along a second axis that is parallel to the pivot axis; and
- a pivot locking structure coupled to the upright member defining a plurality of discrete locking positions at which the platform may be locked, wherein each of the plurality of discrete locking positions comprises a receiving aperture to receive a movable locking member, wherein the movable locking member is movable relative to a rigid member coupled to the platform.

11. The stand according to claim 10, wherein the stand further comprises a plurality of adjustment hook members positioned to apply outwardly-facing opposing forces to the automotive panel, wherein each adjustment hook member comprises a proximal end coupled to the platform and a distal end terminating in a hook structure for engaging the automotive panel.

12. A stand for holding automotive panels comprising:
- a base;
- an upright member extending from the base;
- a platform pivotally coupled to the upright member about a pivot axis for receiving an automotive panel, wherein a length of the platform is adjustable along a first axis that is orthogonal to the pivot axis, wherein a width orthogonal to the length of the platform is adjustable along a second axis that is parallel to the pivot axis, and further wherein the platform comprises:
  - a first frame member lying along a first frame member axis, wherein the first frame member is pivotally coupled to the upright member about the pivot axis, and further wherein the first frame member is movable relative to the upright member in a direction orthogonal to the pivot axis to adjust the length of the platform; and
  - a second frame member lying along a second frame member axis, wherein the second frame member is movably coupled to the first frame member, further wherein the second frame member is movable relative to the upright member in a direction orthogonal to the pivot axis to adjust the length of the platform, and further wherein the first frame member axis and the second frame member axis are parallel; and
- a pivot locking structure coupled to the upright member defining a plurality of discrete locking positions at which the platform may be locked.

13. The stand according to claim 12, wherein the platform further comprises:
- a first frame member locking structure for locking the first frame member at a position relative to the upright member and preventing the first frame member from moving along the first frame member axis; and
- a second frame member locking structure for locking the second frame member at a position relative to the upright member and preventing the second frame member from moving along the second frame member axis.

14. The stand according to claim 12, wherein the platform further comprises:
- at least one first telescoping adjustable arm support member lying along a first telescoping adjustable arm support member axis orthogonal to the first frame member axis, wherein the first telescoping adjustable arm support member comprises a proximal end portion and a distal end portion, wherein the proximal end portion of the first telescoping adjustable arm support member is coupled to a distal end of the first frame member, wherein the distal end portion is extendable from the proximal end portion; and
- at least one second telescoping adjustable arm support member lying along a second telescoping adjustable arm support member axis orthogonal to the second frame member axis, wherein the second telescoping adjustable arm support member comprises a proximal end portion and a distal end portion, wherein the proximal end portion of the second telescoping adjustable arm support member is coupled to a distal end of the second frame member, wherein the distal end portion is extendable from the proximal end portion.

15. The stand according to claim 14, wherein at least one of the first and the second telescoping adjustable arm support members further comprises an adjustment hook member, wherein the adjustment hook member comprises:

a proximal end coupled to the distal end portion of the telescoping adjustable arm support member; and a distal end terminating in a hook structure for engaging the automotive panel.

16. The stand according to claim 14, where at least one of the first and the second telescoping adjustable arm support members further comprises an extension locking structure for locking the distal end portion relative to the proximal end portion.

17. A stand for holding automotive panels comprising:

a base;

an upright member extending from the base;

a platform pivotally coupled to the upright member about a pivot axis for receiving an automotive panel, wherein a length of the platform is adjustable along a first axis that is orthogonal to the pivot axis, wherein a width orthogonal to the length of the platform is adjustable along a second axis that is parallel to the pivot axis, and further wherein the platform comprises:

a first tee-frame pivotally coupled to the upright member about the pivot axis, wherein the first tee-frame comprises:

a first frame member lying along a first frame member axis orthogonal to the pivot axis, wherein the first frame member comprises a proximal end and a distal end, and further wherein the first frame member is movable relative to the upright member in a direction orthogonal to the pivot axis to adjust the length of the platform; and at least one first cross member comprising a coupling portion coupled to the distal end of the first frame member, wherein the at least one first cross member further comprises at least one extension portion extendable from the coupling portion;

a first tee-frame locking structure for locking the first frame member relative to the upright member;

a second tee-frame movably coupled to the first tee-frame, wherein the second tee-frame comprises:

a second frame member lying along a second frame member axis orthogonal to the pivot axis and parallel to the first frame member axis, wherein the second frame member comprises a proximal end and a distal end, and further wherein the second frame member is movable relative to the upright member in a direction orthogonal to the pivot axis to adjust the length of the platform; and at least one second cross member comprising a coupling portion coupled to the distal end of the second frame member, wherein the at least one second cross member further comprises at least one extension portion extendable from the coupling portion; and a second tee-frame locking structure for locking the second frame member relative to the upright member; and a pivot locking structure coupled to the upright member defining a Plurality of discrete locking positions at which the platform may be locked.

18. The stand according to claim 17, wherein the at least one first cross member and the at least one second cross member are extendable to adjust the width of the platform.

19. The stand according to claim 17, wherein the first tee-frame further comprises a first cross member locking structure for locking the at least one extension portion of the first cross member relative to the coupling portion thereof, and wherein the second tee-frame further comprises a second cross member locking structure for locking the at least one extension portion of the second cross member relative to the coupling portion thereof.

* * * * *